US011444772B2

(12) United States Patent
Polcha et al.

(10) Patent No.: US 11,444,772 B2
(45) Date of Patent: *Sep. 13, 2022

(54) FUZZY DATASET PROCESSING AND BIOMETRIC IDENTITY TECHNOLOGY LEVERAGING BLOCKCHAIN LEDGER TECHNOLOGY

(71) Applicants: Andrew J. Polcha, Lovettsville, VA (US); Michael P. Polcha, Lovettsville, VA (US)

(72) Inventors: Andrew J. Polcha, Lovettsville, VA (US); Michael P. Polcha, Lovettsville, VA (US)

( * ) Notice: Subject to any disclaimer, the term of this patent is extended or adjusted under 35 U.S.C. 154(b) by 101 days.

This patent is subject to a terminal disclaimer.

(21) Appl. No.: 16/990,976

(22) Filed: Aug. 11, 2020

(65) Prior Publication Data

US 2021/0058254 A1    Feb. 25, 2021

Related U.S. Application Data

(63) Continuation of application No. 16/107,683, filed on Aug. 21, 2018, now Pat. No. 10,742,416.

(60) Provisional application No. 62/548,216, filed on Aug. 21, 2017, provisional application No. 62/548,298, filed on Aug. 21, 2017, provisional application No. 62/548,356, filed on Aug. 21, 2017.

(51) Int. Cl.
*H04L 9/32* (2006.01)
*H04L 9/08* (2006.01)
*H04L 9/06* (2006.01)
*H04L 9/00* (2022.01)

(52) U.S. Cl.
CPC ......... *H04L 9/3231* (2013.01); *H04L 9/0637* (2013.01); *H04L 9/0866* (2013.01); *H04L 9/3239* (2013.01); *H04L 9/50* (2022.05); *H04L 2209/16* (2013.01)

(58) Field of Classification Search
CPC ... H04L 9/3231; H04L 9/3239; H04L 9/0637; H04L 9/0866; H04L 2209/38; H04L 2209/16
See application file for complete search history.

(56) References Cited

U.S. PATENT DOCUMENTS

| | | |
|---|---|---|
| 4,414,684 A | 11/1983 | Blonder |
| 5,222,153 A | 6/1993 | Beiswenger |
| 5,963,657 A | 10/1999 | Bowker et al. |
| 6,373,969 B1 | 4/2002 | Adler |

(Continued)

*Primary Examiner* — Ali S Abyaneh
(74) *Attorney, Agent, or Firm* — Doster Greene, LLC

(57) ABSTRACT

A system and method and for verifying that distorted biometric information submitted to a computing device is authentic. In various embodiments, the method includes receiving a signal indicative of a distorted biometric of a person; determining a DNA sequence code of the signal indicative of the distorted biometric signal; generating a first dataset based on the DNA sequence code; hashing the first dataset to obtain a second dataset; encrypting the second dataset; storing the encrypted second dataset into a blockchain; comparing the second dataset to a test dataset to determine if the second and test datasets are from a related data source and remain unchanged from the distorted biometric of the person; and updating a new transaction record on the blockchain to indicate that the blockchain transaction has been validated.

6 Claims, 5 Drawing Sheets

(56) References Cited

U.S. PATENT DOCUMENTS

| | | | |
|---|---|---|---|
| 6,836,554 B1* | 12/2004 | Bolle | G06F 21/32 |
| | | | 382/116 |
| 7,120,607 B2 | 10/2006 | Bolle et al. | |
| 7,822,238 B2 | 10/2010 | Bolle et al. | |
| 8,160,307 B2 | 4/2012 | Polcha et al. | |
| 10,742,416 B2 | 8/2020 | Polcha | |
| 2004/0019570 A1 | 1/2004 | Bolle et al. | |
| 2004/0153255 A1* | 8/2004 | Ahn | G16B 30/00 |
| | | | 702/20 |
| 2004/0218789 A1 | 11/2004 | Polcha et al. | |
| 2004/0264746 A1 | 12/2004 | Polcha et al. | |
| 2006/0133651 A1 | 6/2006 | Polcha et al. | |
| 2006/0136743 A1* | 6/2006 | Polcha | G06Q 20/40145 |
| | | | 713/186 |
| 2009/0175508 A1 | 7/2009 | Connell et al. | |
| 2009/0175513 A1 | 7/2009 | Bolle et al. | |
| 2018/0046766 A1* | 2/2018 | Deonarine | G06F 21/62 |
| 2018/0173849 A1* | 6/2018 | Lyons | G06F 16/9554 |

* cited by examiner

Diagram of DNA pattern showing
confidence curves for each data point.

FUZZY DATASET PROCESSING AND BIOMETRIC IDENTITY TECHNOLOGY LEVERAGING BLOCKCHAIN LEDGER TECHNOLOGY

REFERENCE TO RELATED APPLICATIONS

This application is a Continuation of U.S. patent application Ser. No. 16/107,683, filed on Aug. 21, 2018, which will issue as U.S. patent Ser. No. 10/742,416 on Aug. 11, 2020, which claims benefit of U.S. Provisional Patent Application Nos. 62/548,216, filed on Aug. 21, 2017; 62/548,298, filed on Aug. 21, 2017 and 62/548,356, filed on Aug. 21, 2017. The subject matter of the earlier filed applications is hereby incorporated by reference.

BACKGROUND OF THE INVENTION

1. Field of the Invention

The present teachings relates to hashing technology and DNA identity technology using a distributed computer system. More particularly, the technology herein relates to a computer system that interfaces with a distributed computerized ledger system (e.g., a blockchain) to store DNA biometric derivatives instead of storing raw DNA information.

2. Background of the Related Art

An individual's DNA can be useful as a uniquely identifiable biometric attribute in processes and applications requiring identification and authentication of specific individuals. Besides individual-specific uniqueness, an individual's DNA sequence can contain a substantial amount of sensitive and personal information, which may be exploitable information that individuals may want to keep private. Maintaining control over this information can be crucial.

DNA can reveal an extraordinary amount of private information about a person, including familial relationships, medical history, predisposition for disease, and possibly even behavioral tendencies. As genetic sequencing becomes faster and cheaper, there's a growing risk of that information being collected and used against individuals or without their consent. Accordingly, there is an ongoing debate over the use of DNA collection programs for storing DNA data in databases for various purposes. Currently, there are government and private commercial data banks, including those run by health care companies; genealogical DNA testing companies, biobanks under the auspices of the NIH, academic and private research institutions; and the FBI's Combined DNA Index System, routinely used for law purposes.

In these DNA collection programs, DNA sequence can be used to establish an individual's identity by functioning as a unique identifying attribute. There is a great deal of social concern regarding this policy as well as the storage, use, and privacy of individual DNA data. The interpretation of specific gene sequences contained in the DNA evidence is not normally necessary to establish an individual's identity. Technology that reduces DNA sequences to a searchable dataset, useful for identification alone, can have a substantial impact in the areas of law enforcement, security and personal authentication.

The personal nature of DNA and its role as a fundamental blueprint to an individual's life implies significant responsibility to entities that handle, collect and/or store DNA information. Privacy advocacy groups have long recognized the problems of central DNA databasing. Aggregation of large samples of DNA can lead to a Pandora's Box full of social concerns as it potentially represents exploitable power over those individuals who lose control over their DNA to the aggregator. Currently, most people use a trusted middleman such as a biobank to make a transaction. By leveraging blockchain within the biometric registration, allows consumers, governments—any trusted validation authority to connect directly, removing the need for a third party in biometric transaction. This will install a documentation that the transaction happened and install a certain amount of trust that those handling the transaction, have access to the credentials.

Accordingly, it would be advantageous to provide a DNA data storage mechanism, such as blockchain based storage technology, that does not necessarily rely on the delegation of a central authority or the central enrollment, and management. It also may be advantageous to combine the use of DNA biometric derivatives with a decentralized (and ideally individually managed) blockchain based database identity enrollment and management so as to provide a novel solution for the safe use of DNA as an authenticating biometric.

SUMMARY OF THE INVENTION

An object of the invention is to solve at least the above problems and/or disadvantages and to provide at least the advantages described hereinafter.

One or more of the above problems is solved in certain example embodiments by a computer system that is configured to communication with a distributed blockchain computer system that includes multiple computing nodes. The system may include one or more hardware processors configured by machine-readable instructions to create and use DNA biometric derivatives as identifying attributes within an authentication process instead of raw DNA information to ensure an individual's privacy and security. The DNA biometric derivatives can be derived to be just as unique to an individual, but do not contain otherwise sensitive personal information. In an exemplary embodiment, the DNA derivatives can be created by combining an individual's raw biometric with a unique distortion element. The DNA derivatives properly leverage the individual uniqueness that raw DNA biometrics provide without unnecessarily exposing the sensitive and private information within DNA to transactions, communication and exchange, and storage or data warehousing thereby significantly increasing individual DNA privacy.

In accordance with another embodiment, the present invention provides a system and method comprising a receiver which receives biometric information which is combined with one or more unique distortion elements that serve as one or more keys to provide a set of possible biometric derivatives. The resulting unique biometric derivatives can represent one of a multiplicity of possible user specific biometric derivatives.

In various embodiments, the present invention provides an improved distributed computer system and method for performing identification based on biometric information.

In various embodiments, the present invention provides an identification system and method which identifies enrolled users more accurately by considering multiple degrees of uniqueness, based solely on biometric data or on a combination of biometric data and one or more unique attributes. The identification system and method is sufficiently flexible to perform personal identification confirmation based on virtually any type of biometric.

These and other objects and advantages of the present invention are achieved by providing a biometric identification method which includes receiving a signal indicative of a combination of two or more unique identity attributes, at least one of the unique identity attributes corresponding to a biometric of a person, comparing the signal to one or more identity patterns, and verification of the person's biometrics based on results of the comparing step. In one embodiment, a second unique identity attribute may be a predetermined distortion pattern. In this latter case, the combination signal is indicative of a distortion of the biometric using the predetermined distortion pattern. This pattern may be a non-linear distortion pattern, a mask, or any other pattern or insignia that can be identified by a processor using known recognition techniques. In another embodiment, the second unique identity attribute is another biometric of the same person. This biometrics may be an eye pattern, fingerprint, palm print, voice, handwriting sample, face, or DNA sample. In the event a breach occurs, a different type of distorted biometric may be used to protect system integrity.

In one embodiment, by distorting the biometric (i.e. during the registration process) before it is input into the system, the present invention ensures that system security cannot be breached by theft of the biometric itself. The distortion element therefore in effect serves as a key which when combined with the biometric provides two degrees of uniqueness which must be satisfied before a positive identification result can be confirmed. Moreover, if the distorted biometric of a person is ever lost or stolen, the present invention can easily re-enroll biometrics into the system or switch to a different previously enrolled biometric altered using a different unique distortion element. Additional embodiments contemplated combining three or more degrees of uniqueness for providing an even greater level of security.

In an alternative embodiment, the biometric may be distorted automatically by the system after the biometric is entered into the system according to preprogrammed standards and/or policies of the system. In a computer-implemented distorted biometric, software associated with the system can digitally distort the individual's biometric upon entry into the system, for example, when detected by a biosensor.

In accordance with another embodiment, the present invention provides a system and method that, after receiving a signal indicative of a combination of two or more unique identity attributes, at least one of the unique identity attributes corresponding to a biometric of a person, the system includes convening a plurality of fuzzy data values into a first dataset based on the distorted biometric data. Each fuzzy data is transformed into a data value and at least one range value. The respective data values and range values are arranged in at least two data series of the first dataset, respectively. Then, the first dataset is transformed into a second dataset using a hash function, wherein relationship of the data values and range values of the at least two data series are maintained.

Additional advantages, objects, and features of the invention will be set forth in put in the description which follows and in pan will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

In general, the present invention is a system and method for controlling authentication and verification based on the identification of biometric data which has been altered, modulated, encoded, or otherwise distorted either prior to or after input into the system. Authentication and verification for a system can include, for example, computers (e.g., main frames, desktops, portables including PDAs and notebooks), computer networks (e.g., Internet-based systems, ones performing e-commerce transactions and on-line banking), financial systems (e.g., ATMs, ones performing credit-card-based transactions), communication systems used in the public and private sector, as well as other system for which restricted access is sought or deemed to be desirable.

Figure 1A:
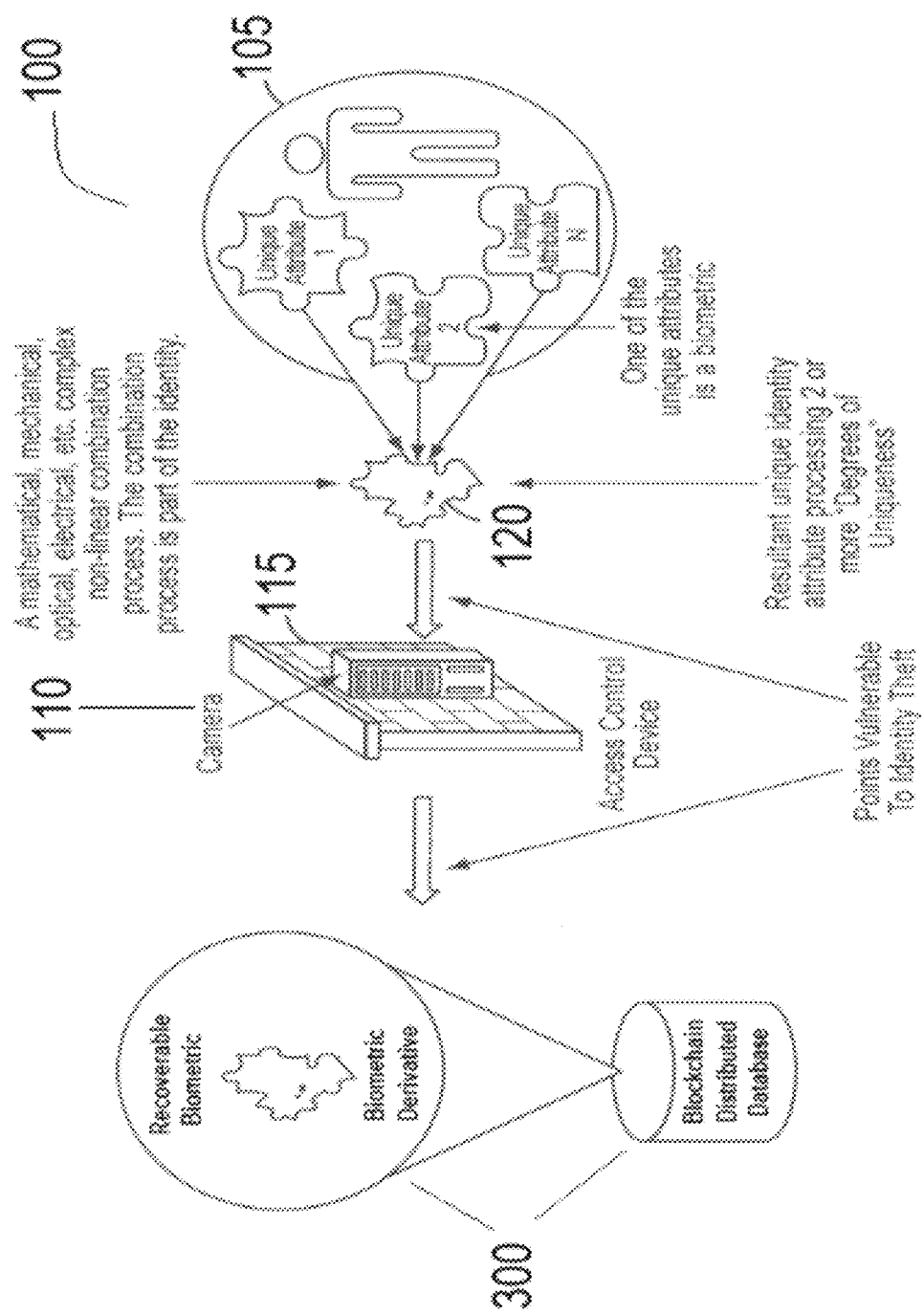
FIG. 1A is a diagram showing an exemplary biometric identification system in accordance with the present teachings.

FIG. 1A shows a biometric identification computer system 100 according to one embodiment of the present invention. The computer system 100 may include various interfaces in various layers (e.g., software layer, hardware-software layer, and hardware layer). To implement the computing according to the present invention, an interface may be located at a few different layers, such as for example, software layer, hardware-software layer, and hardware layer. The interfaces are configured to function collaboratively to enhance the system's computing operations.

As shown in the exemplary embodiment in FIG. 1A, system 100 can include a distortion element 105, an access point 110, and a control processing system 300 (which is further described below in reference to FIG. 3 and the blockchain technology). These features may be provided at separate locations and linked together by any number of wireline or wireless connections, or the elements may be combined to form a single integrated unit sized to fit a particular application. In this integrated form, distortion element 105 may be included within or adjacent a detector (i.e. a biosensor) in the access point 110. However, a more preferable alternative may be to allow this element to be carried by persons to be identified, much in the same way a key or employee identity badge is carried. In this latter case, the distortion element 105 may be adapted to fit over and/or be removably coupled to the input unit, the distortion element 105 may be held by the user between the biometric source and the input unit or may otherwise be situated.

Structurally, the distortion element 105 is selected to coincide with the type of biometric obtained from a person whose identity is to be determined. Rather, it is sufficient to acknowledge that the distortion element 105 may be one capable of imposing any form of distortion on a biometric.

This distortion includes but is not limited to non-linear distortion, various types of modulation, and/or one or more forms of encoding imposed mechanically, optically, electrically, or through mathematical or signal processing techniques.

Irrespective of the type of distortion imposed, the purpose of the distortion element is to alter the form of the biometric as received from its source, so that the biometric as presented to the system decision unit is different from its original form. This ensures that inputting a person's biometric directly into the system will always result in failed recognition, which is beneficial from the standpoint of protecting the integrity of the host system from unauthorized breach as well as for a variety of other purposes.

The access point 110 can include an input unit 115, which includes a detector for detecting or otherwise receiving the distorted biometric output from the distortion element. The particular input unit used depends on the type of modified biometric generated by the distortion element. Non-limiting examples are identified in embodiments which follow. To make security access more convenient and informative, the access point optionally but preferably includes a control panel with a display or other indicator that provides information, instructions, and/or messages to each person presenting a modified biometric for identification. The control panel (not shown in great details) may also include a keyboard or other data input device for receiving information including, for example, additional identification data in the form of a PIN or password.

In general, the control panel can include, for example, a display screen, a keypad and/or a number of function buttons, and a detector for detecting or receiving a distorted biometric 120. Namely, the control panel may include a detector for detection of a distorted biometric 120 either alone or in combination with one or more other unique identity attributes.

During the registration process, the enrollment station at the access point 110 captures new distorted biometrics 120 for persons who are already registered in the system and for persons to be added. The enrollment station includes a distortion element 105 for distorting biometric as received from its source and a detector for receiving the distorted biometric 120. In order for positive identification to occur, a person must at a minimum present the same biometric using the same distortion element as was presented during enrollment. The identification system of the present invention thus may be said to require at least two unique identity attributes to be presented in proper combination in order for a positive identification to occur, where the first and second unique attributes correspond to the biometric and the specific type of distortion imposed on the biometric. While the enrollment station is depicted to be separate from the input unit at the access point, those skilled in the art can appreciate that enrollment may also be performed by this input unit.

The control processing system 300, which is described in greater detail below, generally includes a processor 315 is communicatively connected to a data repository 300 as a storage unit, and an enrollment station (e.g. user device 310 and user interface 325). The data repository 300 stores information for each person to be identified by the system. This information includes an identity pattern that corresponds to a distorted biometric obtained during an enrollment process and optionally but desirably one or more other forms of identifying data (e.g., PIN or other access number or password, social security number, driver's license number, address, citizenship, marital status, and/or other forms of personal information that may be used as an independent basis for identification). If desired, the data repository 330 may store multiple identity patterns for each person, where each pattern is generated using a different distortion element. This provides a degree of flexibility to the system while simultaneously enhancing security. For example, a system manager or system software may change the distortion element to be used and thus the identity patterns to be searched, for example, on a periodic basis or when a breach of the host system has occurred.

The data repository 330 may be a database included within or externally connected to the identification decision unit via a wireless or wireline communications link. Alternatively, the storage unit may be a memory chip storing the identity patterns for each person presented for identification. This latter case is preferable when, for example, the system is formed as an integrated unit. Those skilled in the art can appreciate that other forms of storage devices may be used to store the identity patterns in accordance with the present invention.

The processor 315 compares the distorted biometric received from the input unit with one or more identity patterns in the storage unit of the data repository 330. The comparison function is performed by processor 315 under control of an application program 320 which can be stored in a memory device. The type of comparison performed depends on the type of distorted biometric received. The comparison may, for example, involve a spectrum signal analysis or a pattern recognition analysis performed using a neural network, statistical model, or other type of signal processing technique.

The control processing system 300 generates new identity patterns from the distorted biometrics obtained from the enrollment station. These patterns are then forwarded to the storage unit of the data repository 330. The control processing system 300 also performs a number of other management functions. For example, when multiple identity patterns (e.g., distorted biometrics) are stored for each person, the controller may specify which distorted biometric type is to be used by the decision unit (logic 340) for identification.

In addition to these functions, the control processing system 300 may be used to edit and/or delete identity patterns or other identification information in the storage unit. Also, this controller may control the input unit in terms of when it is active and what messages, information, or other data is to be displayed. If multiple detectors are included in the input unit, the control may also designate which detector is to be activated.

Figure 1B:
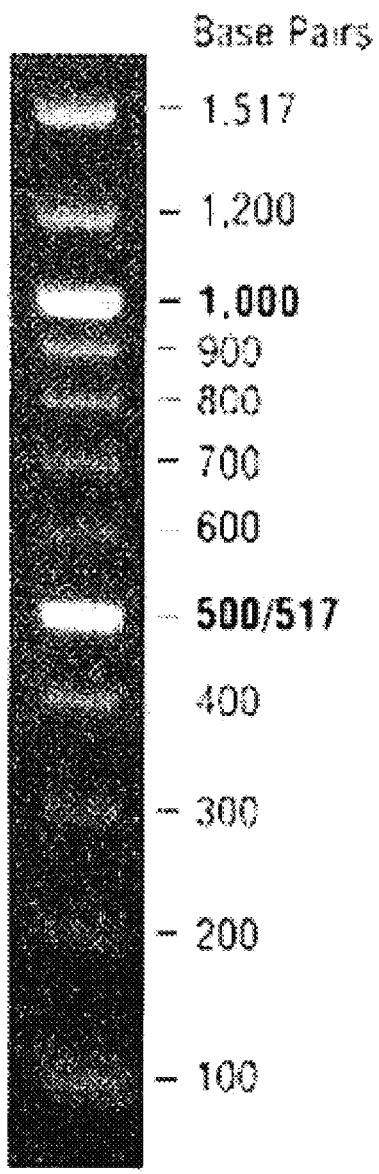
FIG. 1B illustrates an DNA bands for base pairs obtained using related art techniques.

To illustrate, consider the case of the distorted biometrics are enrolled into the system and DNA sequencing is performed. The actual process of DNA sequencing described herein can be performed with sophisticated automatic sequencing machines, such as capillary sequencers, and assembler computer programs, or manual sequencing with human intervention using known techniques such as electrophoresis. As discussed above, identification of an individual using DNA is typically substantiated by direct comparison between measurement of DNA samples in question against measurements of samples of an individual's known DNA sequence. However, DNA sequences are not always a perfectly reproducible dataset. An example of a DNA sequence is illustrated in FIG. 1B, which shows various base pairs. As will be appreciated by those skilled in the art, the sample illustrated in FIG. 1B of the DNA data is determined by various bands (or ranges) of markers. Accordingly, there is always some amount of statistical variation in both the measurement and in the comparison of DNA sequences. Thus, any process used to digitize and store DNA sequence data will also three (3) contain statistical variation as well. An illustration of this statistical variation is illustrated in FIG. 1B.

The technique of digital hashing is a process that computes a fixed length binary sequence from an input dataset that is unique to that dataset. Three aspects of a hash function, as found in the Microsoft MSDN Library Version 6.0, are listed below.

1.) A hash is a fixed-size result obtained by applying a mathematical function (the "hashing algorithm") to an arbitrary amount of data.
2.) A good hash function has a quality where changes in the input data can change every bit in the resulting hash value; for this reason hashes are useful in detecting any modification in a large data object, such as a message.
3.) Furthermore, a good hash function has the quality where that it is computationally infeasible to construct two independent inputs that have the same hash.

The first and third points allows for application of hashing to DNA sequences, turning DNA sequences into "Super Fingerprints". These Super Fingerprints can ensure privacy for DNA information while preserving its uniqueness and usefulness for identification purposes.

Figure 1C:
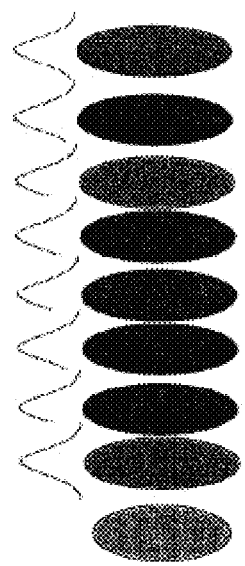
FIG. 1C illustrates a diagram of the DNA bands showing confidence curves for each data point.

The second point facilitates understanding the application of hashing to DNA sequences, This point illustrates that traditional hashing algorithms will not be useful for hashing data such as DNA sequences. This is because a DNA sequence is a dataset that contains some amount of statistical variation or "noise", as illustrated in FIGS. 1B and 1C. Datasets such as these are called fuzzy datasets. The second concept in the above definition shows that hashing two fuzzy datasets which are substantially similar, will result in wildly different results. Accordingly, a meaningful comparison between conventionally hashed fuzzy dataset would be impossible.

An innovative technique, useful for hashing fuzzy data, such as DNA sequences, accounts for the presence of noise in the dataset. The amount of noise in the data can be determined by the repeatability of the DNA sequencing process. Using statistical techniques, upper and lower limit numbers can be calculated for each data point in the dataset. These upper and lower numbers can be used as boundaries for allowable variation in each data point and also to help in quantifying variation when comparing two datasets.

Figure 2A:
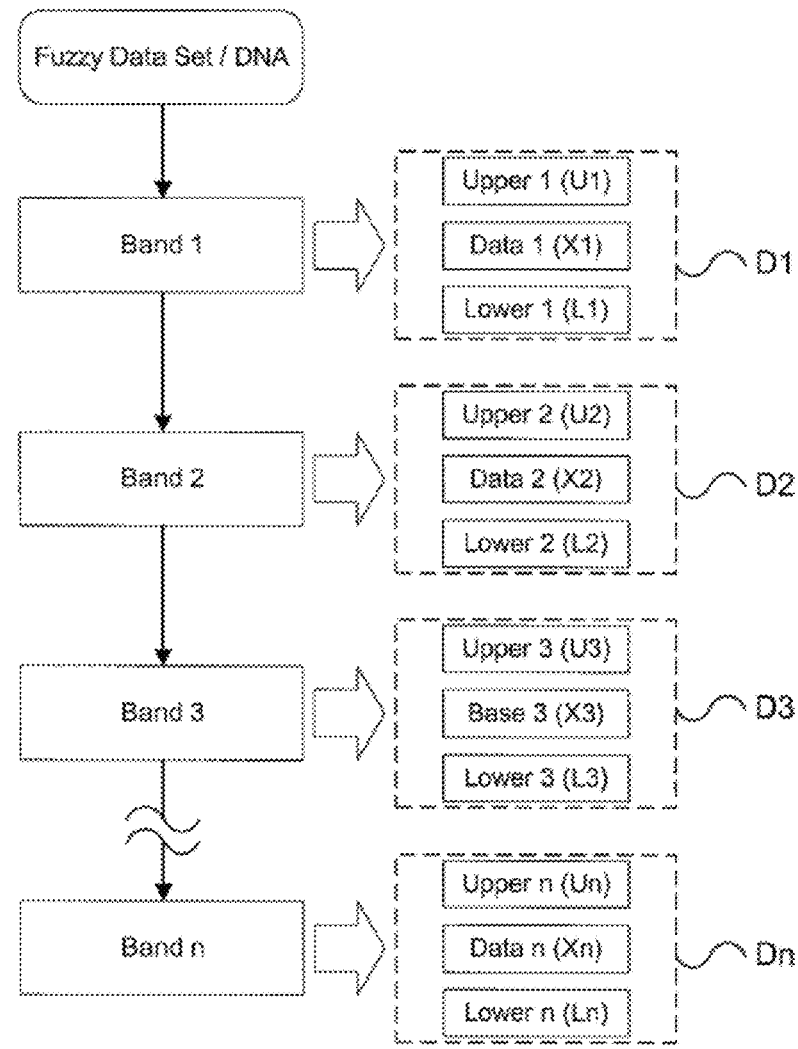
FIG. 2A illustrates a converting the data bands into a first dataset representing the fuzzy data of the bands.

For example, as illustrated in FIG. 2A, the various bands (Band 1-$n$) of the DNA sample are reduced to discrete data $D_1$-$D_n$, each of which can include a data value and upper and lower limits for the range. Those skilled in the art will appreciate that other representations data representations can be used. For example, the band can be defined by a data value and a delta value (i.e., the range is data+/−delta), upper and lower limits only, percentage variation from the data value, and the like. However, for purposes of illustration only, the data value (X1-Xn) with the upper (U1-Un) and lower limits (L1-Ln). These values can then be compiled into a first dataset 210, which can be transformed into a second related dataset 220.

The first dataset 210 represents the fuzzy dataset of the DNA bands. A typical hashing algorithm operates on individual bits in the dataset, but bit level algorithms such as those are not acceptable for Fuzzy datasets. After boundaries for each data point have been established, as illustrated in D1-Dn, the dataset is decomposed into small pieces. Each small piece of data can be sectioned in such a way as to represent linear elements of the data points.

An example of this concept can be illustrated using IEEE floating-point numbers. A floating-point number is a multi-byte data type that stores the numerical mantissa and exponent in separate data fields. In this example, the mantissa part of the data would represent a linear data element. This linear data element can be decomposed into its individual bytes, each representing a separate linear data element. While decomposing the mantissa into its individual bytes, the upper and lower limit numbers can be decomposed as well. In the case where the mantissa is decomposed into bytes, the upper and lower limit numbers would also decompose into bytes which would correspond to the allowable deviation in either direction from the byte values of the decomposed mantissa. Additional consideration should be given to situations in which upper and lower boundaries involve carries or changes in order of magnitude. These circumstances will have to be accounted for during decomposition. These same steps can be carried out for the exponent part of the data points as they represent important linear elements in the data set as well. It is expected to be observe that the data elements that represent the most significant digits in the data points will have the least amount of allowable variation according to the upper/lower boundary numbers.

Figure 2B:
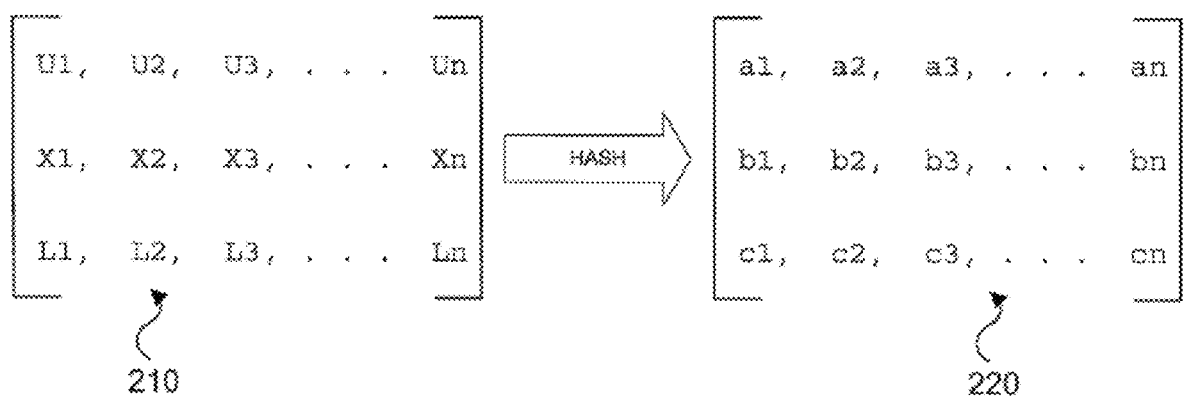
FIG. 2B illustrates transforming the first dataset into a second dataset.

Once the data points and upper/lower limits have been decomposed into small linear elements, the small linear elements can be mixed using a hashing algorithm. The small linear elements are preserved by the algorithm, but the algorithm is free to mix-up the order of the elements. Further, the upper/lower limit elements are mixed-up in the same order as the data points. The result in this example is a hashed series of bytes that represent linear elements from data points in the data set, with two corresponding series of bytes representing the upper and lower boundary values for each byte in the dataset 220, which is illustrated in FIG. 2B.

In this form, it is possible to compare two hashed results without recovering the original dataset (e.g., the original DNA data). For example, a comparison can be performed by verifying that each byte of the hash value being compared falls within the limits of variation around each byte of the reference hash value.

The boundary values for the data represent information that can be useful for decoding the hashed value. Accordingly, a second level of encryption can be used. Those skilled in the art will appreciate that known encryption techniques can be used as the data has already been decomposed and is in a discrete format. This second level can combine the data including the boundary values and encrypt it thereby providing an added layer of security regarding the underlying raw data.

After encrypting, the process of comparing two hashes involves decrypting each hash into three series (one hashed linear data element series and two boundary series) and compares the two linear data series using the boundary data. Since the data does not need to be decrypted on both levels for comparison, the privacy of the underlying source data (e.g., DNA sequence) is preserved.

Although the foregoing description has been directed to a dataset derived from DNA, the present invention can be applied to any fuzzy datasets. Accordingly, an embodiment of the present invention includes a system and method comprising transforming a plurality of fuzzy data values into a first dataset 210. Each fuzzy data is transformed into a data value and at least one range value (e.g., as illustrated in FIGS. 2A and 2B). The respective data values and range values are arranged in at least two data series of the first dataset, respectively. Then, the first dataset 210 is transformed into a second dataset 220 using a hash function, wherein relationship of the data values and range values of the at least two data series are maintained. For example, the relationship between U1, X1, and L1 in the first dataset 210 is maintained in the second dataset 220. However, those skilled in the art will appreciate that the relationship does not have to be linear (i.e., U1 to a1, X1 to b1, etc.). To further protect the underlying source data (e.g., DNA sample), the second dataset 220 can be ordered in a specific pattern or pseudo random pattern with respect to the data series of the first dataset 210. However, the relationship of the data series should be maintained and generated in a repeatable manner so that a test dataset generated from the same source can be compared to the second dataset 220 (i.e., hashed data) level. Thus, even the representative data of the first dataset 210 does not have to be decoded to determine if the datasets are from the same source.

Further, the system and methods according to embodiments of the present invention can further include encrypting the second dataset 220 and storing the encrypted second dataset to a database. Since the second dataset 220 is encrypted, the database contains data that is not readily comparable for purposes of searching. Accordingly, the system and methods can further include retrieving the second dataset 220 from the database and decrypting the second dataset 220. Then, the second dataset 220 can be compared to a test dataset to determine if the second and test datasets are from a related or same data source. The test and second datasets can be determined to be from a related source if a majority of the corresponding data values of the test and second dataset are within corresponding ranges determined by the corresponding range values. However, those skilled in the art will appreciate that other match criteria can be established, such as, a requirement that all or substantially all data values correspond.

As noted above the invention is not limited to a particular fuzzy dataset. However, if the second dataset 220 is derived from a first DNA sample and the test dataset is derived from a second DNA sample, one can appreciate that the system and method can be readily applied to an identification system using DNA data. Specifically, the first dataset 210 and second dataset 220 can be determined to be from a related source if the first and second DNA samples are obtained from one person. Therefore, the datasets can be used as a screening tool by law enforcement, medical professionals, researchers, and the like without disclosing specific information regarding the subject's DNA. For example, the DNA hash comparison (i.e., comparison of the test and second datasets) that show likely matches can be used to justify the more conventional, courtroom tested DNA matching.

Further, as will be appreciated by those skilled in the art since the datasets are based on fuzzy data, range values are used to provide a confidence window for matching the datasets. The range values can vary according to the data, statistical reliability of the data and other factors as is known in the art. The range value can be defined using a variety of techniques, which are known in the art. For example the range can be defined by an upper limit value and a lower limit value, a percentage value (e.g., a percentage+/− of the data value), a delta value (e.g., the data value+/−delta value), a lower limit value using the data value as an upper limit or an upper limit value using the data value as a low limit.

The invention has been described in connection with a number of exemplary embodiments directed to a system and method. To facilitate an understanding of the invention, many aspects of the system and method previously described in terms of sequences of actions to be performed can be performed by elements of a computer-based system.

It will be recognized that in each of the embodiments, the various actions could be performed by specialized circuits (e.g., discrete logic gates interconnected to perform a specialized function), by program instructions being executed by one or more processors, or by a combination of both. Thus, the various aspects of the invention may be embodied in many different forms, and all such forms are contemplated to be within the scope of the invention. For each of the various aspects of the invention, any such form of an embodiment may be referred to herein as "logic configured to" perform a described action. Accordingly, those skilled in the (art will recognize an embodiment of the present invention includes an apparatus comprising the logic configured to perform the sequences described in the foregoing description.

Figure 3:
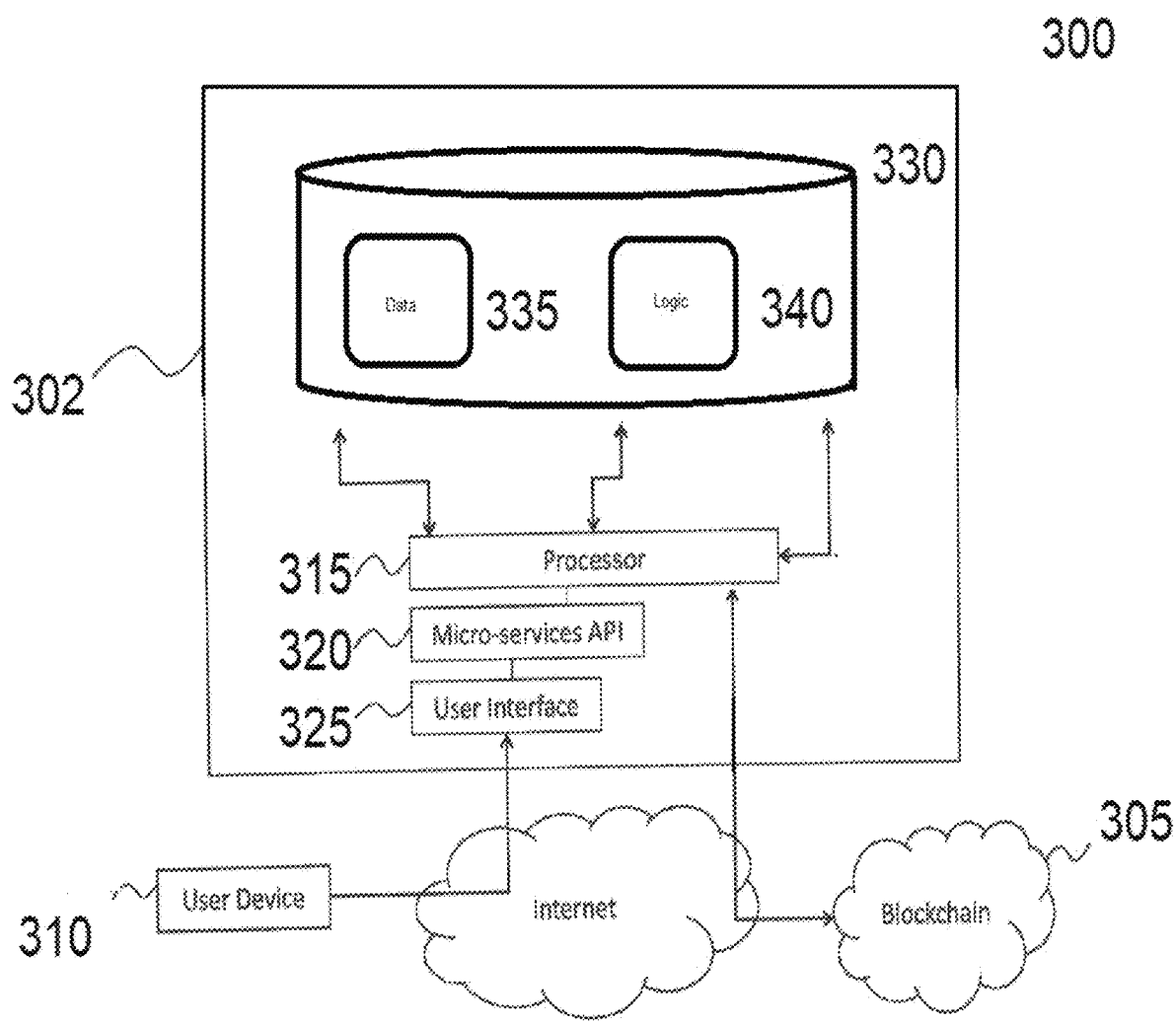
FIG. 3 illustrates a block diagram of a computer system that interfaces with a blockchain according to the present teachings.

FIG. 3 illustrates a non-limiting example function block diagram of a control processing system 300 of the biometric derivative based identity system according to the present invention that includes a computer system 302 that interfaces with blockchain 305 to verify unique biometric derivatives according to certain embodiments. The computer system 302 may include a combination of software and hardware interfaces, programmed business logic, processing resources, and electronically addressable storage. The computer system 302 is responsible for tracking and executing computer programs for the purpose of authenticating DNA biometric derivatives as identifying attributes within an authentication process instead of storing raw DNA information into the system to maintain an individual's privacy and security.

According to the exemplary embodiments of the present teachings, recoverable biometric technology is implemented to replace the use of biometrics with biometric derivatives. According to the present invention, the biometric derivative is derived before being input into the system or by the system and method such that it has the same user specificity as a raw biometric-based identity. The biometric derivative is derived so that it is comprised of an individual's raw biometric combined with a unique distortion element. The resulting unique biometric derivative represents just one of a multiplicity of possible user specific biometric derivatives. The set of possible distortion elements in combination with an individual's singular raw biometric results in the set of possible biometric derivatives, as will be described in detail below.

The biometric derivative based identity system according to the present invention provides more efficient commerce with respect to such items:

Uniquely identifies actors representing unsubstantiated credentials to authenticators Attaches the identifier physically to an individual (i.e. their biometric+distortion element)

Properly redress system entropy due to identity theft

Computer system 302 references or includes records or data for users, participants, digital assets, and blockchain transactions. Individual users are identifiable entities (e.g., that are unique) that can be assigned management and control of a digital asset that is also tracked by the system. Users can be uniquely identifiable entities that have permissions to view, update, and/or control information within the system.

Digital assets (also referred to as "biometric data", "DNA data" or "distorted biometric data" herein) are also identifiable entities (e.g., that are unique) that can be tracked, managed, and verified by the computer system 302. Transactions for verifying an individual's biometric data are digital transactions that can be submitted into the computer system 302 and/or validated by a corresponding blockchain 305 (e.g., a distributed digital ledger). By leveraging blockchain technology within the biometric registration, this allows consumers, governments—any trusted validation authority to connect directly to the computer system and eliminate the need for a third party in a biometric transaction. The system will provide documentation to verify that the transaction occurred and provide a level of trust to those conducting the transaction have access to the credentials. In accordance with various embodiments of the present teachings, recoverable biometric technology consists of replacing the use of biometrics with biometric derivatives. A biometric derivative derived according to the present invention has the same user specificity as a raw biometric-based identity, i.e., it is comprised of an individual's raw biometric combined with a unique distortion element. In the case of recoverable biometric transactions leveraging blockchain, both components of the transactions (i.e., the raw biometric and the hardware/software layer to alter the biometric data at the binary level), can be recorded, tracked and traced throughout the ledger. By way of example, FIG. 1B-2B shows examples of biometric data and the corresponding datasets, which are all unique identifiers that are tracked by the computer system 302 and, incorporated as part of generated and validated blockchain transactions.

In communication with a network, the system 302 is provided blockchain 305 as a sequential transactional database that may be distributed and is communicatively connected to the system. The blockchain 305 can be maintained, stored, and updated, by some or all nodes participating in system 302. A full copy of the blockchain contains every transaction ever executed in an associated biometric data.

The blockchain 305 may be based on several blocks. A block may include a record that contains and confirms one or more transactions. In various embodiments, accessing the blockchain 305 are components as software, hardware, firmware or combination components adapted to access transactions submitted to the blockchain 305 for validation of the transactions and for generating new blocks of validated transactions for appending to the blockchain 305. In some embodiments, a new block including transaction can be periodically appended to the blockchain 305.

In certain example embodiments, the blockchain 305 may be a publicly distributed transaction ledger. Embodiments of the computer system 302 may further include a blockchain module(s) that include one or more components of hardware and/or software program code for accessing and/or utilizing the publicly distributed transactions ledger 305 (i.e. blockchain) to store and/or view transaction information, such as the hashed computer readable information and the digital signature, details regarding the source of the computer readable information, metadata of the computer readable information, time details, and the like, using the public key and/or the private key generated by the computer system 302. Transaction information may be recorded on the publicly distributable transactions ledger 305. The recordation of the computer readable information-related transactions is immutable and almost impossible to fraudulently change the details of the transactions stored on the ledger 305 due to the nature of the decentralized ledger, otherwise referred to as the blockchain. Embodiments of ledger 305 may be a distributed peer-to-peer network, including a plurality of nodes. The ledger 305 may represent a computing environment for operating a decentralized framework that can maintain a distributed data structure. In other words, ledger 305 may be a secure distributed transaction ledger or a blockchain that may support document management. Each node may maintain an individual public ledger (i.e. maintained publicly) according to set procedures that employ cryptographic methods and a proof-of-work concept. In view of the public nature of the ledger and the proof-of-work concept, the nodes collectively create a decentralized, trusted network. Further, embodiments of the publicly decentralized trusted ledger 305 may be accessible by the computer system 302 and a user computer 310 for verifying a transaction, completing a transaction, or viewing transactions details.

In an exemplary embodiment wherein blockchain 305 represents a publicly distributable transaction ledger, the blockchain may include a plurality of blocks. Each block, such as first block 210 and second block 220 in FIG. 2B, may include data regarding recent transactions and/or contents relating to computer readable information, linking data that links one block 220 to a previous block 210 in the blockchain, proof-of-work data that ensures that the state of the block chain 305 is valid, and is endorsed/verified by the system. The confirmed transactions of the blockchain can be performed using cryptography to ensure the integrity and the chronological order of the blockchain are enforced and can be independently verified by each node of the blockchain. Blockchain 305 can demonstrate "proof of work" such as by evaluation of a hashing process to achieve a particular output. Each transaction (or a block of transactions) is incorporated or included into the blockchain 305 via a proof-of-work mining process. The mining process may involve solving a computationally difficult problem that is also easy to verify. For example, each node may attempt to "mine" a solution to the hash of a block or a transaction. Hashes (also referred to herein as "hash functions," "cryptographic hash functions," and the like) include functions that map an initial input data set to an output data set. The output from a hash function may be referred to herein as a "hash identifier," "hash value," "hash data set," or simply, a "hash"). For example, in some embodiments, second block 220 in the blockchain 305 contains a hash of the previous block 210, as shown in FIG. 2B. New transactions may be added to the blockchain using a distributed consensus system that confirms pending transactions using a mining process, which means that each transaction can easily be verified for accuracy, but very difficult or impossible to modify.

In certain example embodiments, the blockchain 305 may be a private blockchain implementation (e.g., where only authorized parties are allowed to read and/or write to the blockchain). In certain examples, different entities may control different ones of the computer nodes that are responsible for maintaining the blockchain.

Using cryptography to keep exchanges secure, blockchain 305 provides a decentralized database, or "digital ledger", of transactions that all participants on the network can observe the transactions. The network is essentially a chain of computers that must all approve an exchange before it can be verified and recorded. Within the public Internet, this may take some additional amount of time for the verification to occur and the transaction recorded. Within private, enterprise network LAN infrastructure, this transaction chain of verification is certainly contained within a smaller topology; reduction of breach or fraud can happen because every transaction is recorded and can be tracked or traced within the topology. Within the example of a Public network, every transaction can be recorded and distributed on a public ledger for anyone to observe.

In the present teaching of a recoverable biometric transaction leveraging blockchain; both components of the transaction, the raw biometric and the hardware/software layer to alter the biometric at the binary level, can be recorded, tracked and traced throughout the ledger 305.

Computer system 302 also includes computer processor (processor) 315 that executes or runs the micro-services application programming interface (API) 320 and user interface 325. The computer system 302 and the blockchain 305 are linked to each other by a communication network such that they can communicate via the network and the processor 315 also runs services for the blockchain that may include functionality to both send and receive blockchain related transactions and events. For example, a transaction may be submitted to the blockchain 305 for validation. It will be appreciated that processor 315 may be one or more processors. In certain examples, processor 315 represents a distributed computing system.

Micro-services API 320 is an application programming interface that allows machine readable data retrieval and interaction with computer system 302 by external computing sources.

User interface 325 allows a user, via user device 310, to view, update, and/or control the digital ledger. Users can view the digital ledger and interact with the data contained therein through a set of pre-programmed actions. A fully auditable record of every interaction with the ledger may be created and stored for subsequent review. In certain examples, the user interface 325 may be in the form of a web page or dedicated client application.

Computer system 302 can include one or more data repositories 330. These repositories may be included as part of a single database (e.g., a relational database), may be separate databases, or may be stored by using other techniques (e.g., a flat file, or other data structure). In certain examples, the storage repositories of the computer system 302 are located in-memory and/or on separate logical or physical devices.

The data repository 330 is configured to store data 335 and logic 340 that is used by the computer system 302 to verify an individual's biometric data.

Data storage 335 can include records of all participants that can own or otherwise interact with resources defined within the system. Data storage 335 may include public keys, private keys, and blockchain addresses or participant identifiers (e.g., derived by using a one-way hash of a public key) associated with the participant and these may be used for tracking blockchain transactions made by that participant. In certain example embodiments, the participants (e.g., a computing system controlled or maintained by those participants) can manage their corresponding private keys separately from the computer system 302. Thus, when computer system 302 interacts with a blockchain to create a blockchain transaction that is to be digitally signed by that participant, the computing system controlled by the participant may supply the private key and/or may digitally sign the transaction and transmit the digitally signed transaction back to the computer system 302 for subsequent submission to the blockchain 305 for verification.

Data storage 335, in conjunction with the blockchain services, can also interface with the blockchain 305 to store records of validated (or to-be-validated) blockchain transactions. A record in data storage 335 may include source and destination identifiers that are mapped back to respective participants, a blockchain transaction ID, the unique identifier for the biometric data, the type of biometric data submitted, distortion element, distorted biometric data, a transaction date (e.g., when the transaction was submitted to the blockchain), a validation date (e.g., when this transaction was ultimately validated by the blockchain), etc. . . . .

The data repository 330 can store one or more versions of the data stored therein and generate a set of input data and/or a set of output data as shown for example in FIGS. 2A-2B. that corresponds to the selected version of the data. The logic 340 stored by the data repository 330 includes logic for defining the content of the input data in FIG. 2A. More specifically, the data repository 330 may be configured to store logic that defines the attributes that need to be included in the input data for verifying an individual's biometric. This helps to ensure that valid input data is provided during verification. The logic for defining the content of the input data designates one or more attributes of the input data and/or one or more attributes of a reference data as being attributes whose values determine the data processing operation that is performed by the system and identifies a plurality of values or ranges of values of the designated attributes.

The logic 340 stored by the data repository 330 also includes logic for defining the content of output data as shown for example in FIG. 2B that is generated by the computer system 302. More specifically, this logic describes each value of the attributes of the output data as a function of the values of the attributes of the input data. Thus, the logic 340 allows the data generation component to generate output data that corresponds to the input data.

Figure 4:
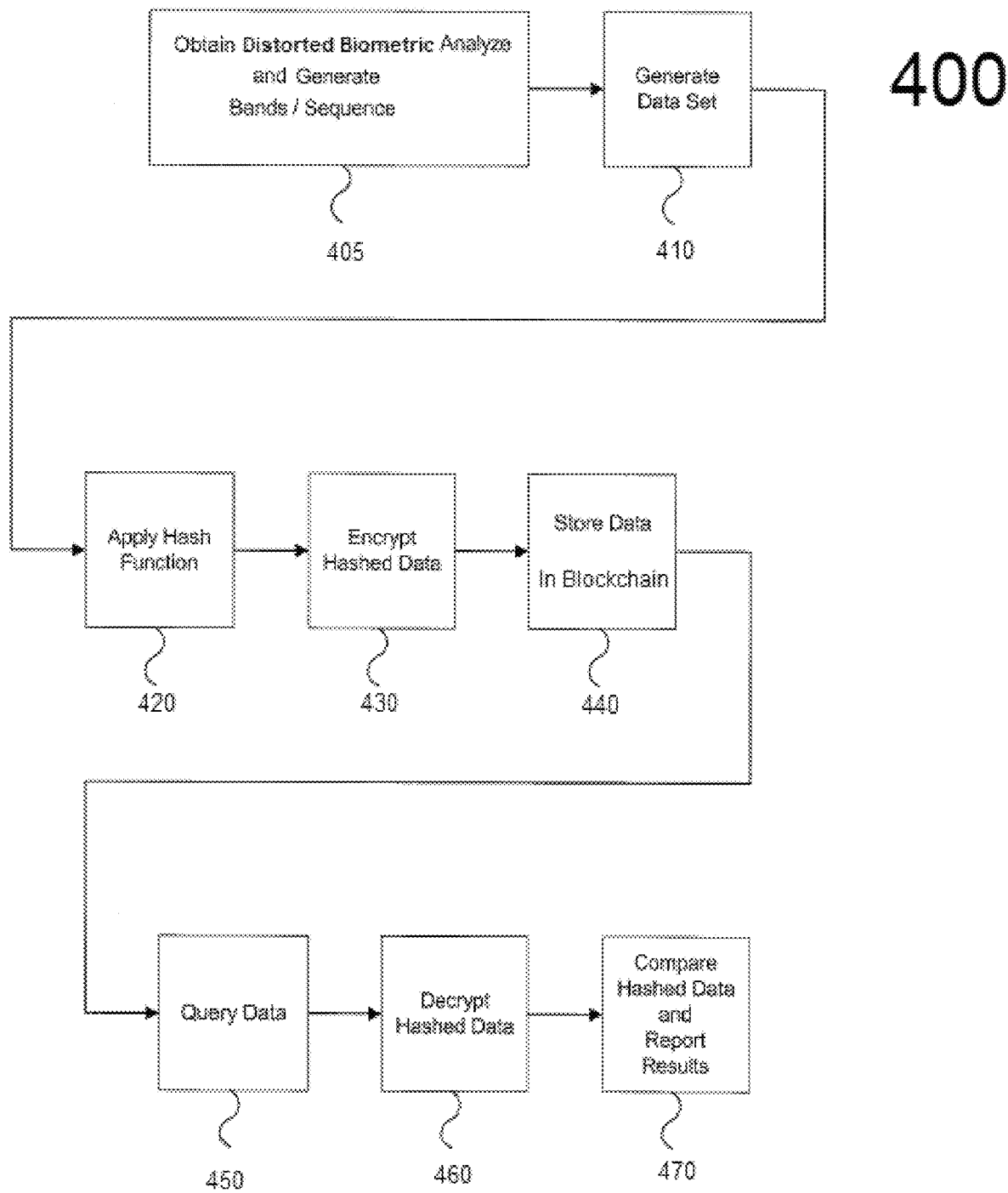
FIG. 4 illustrates an example process for verifying biometric data on the system in FIG. 3 according to an embodiment of the present teachings.

FIG. 4 shows an example process 400 for verifying an individual's biometric data. Therefore, an apparatus employing these techniques can acquire, hash, store, and compare DNA data, without disclosing the underlying DNA data. FIG. 4 illustrates a block diagram of system elements employing the foregoing techniques according to embodiments of the present invention. Biometric data, such as DNA data samples, can be obtained and the distorted biometrics can be generated in Step 405. The biometric data may reflect measurable characteristics unique to each person. The biometrics data can be patterns derived from physical features (e.g., fingerprints, palm print, iris patterns scanned from an eye, facial scan patterns, etc.), emissions (e.g., voice patterns, a handwriting sample, DNA samples, blood samples, hair samples, etc.) of a human body or any other type of characteristic or behavioral attribute of a person. The DNA samples can be, for example, blood, hair, cheek swabs, and the like as known in the art obtained using conventional techniques and devices, such as a biosensor. In response to the individual's input of the distorted biometric data into the system, a verification request is received by a transceiver of the computer system 302 and is passed to the user interface 325 or micro-services interface 320 for processing.

In Step 405, once the DNA sample is obtained and the distorted biometrics are generated, the distorted biometric data is input into the system wherein the process performs further analyzes to generate the DNA bands/sequences. For example, wherein the biometric is an eye pattern (e.g., retina or iris) and the distortion element is a lens having a non-linear refractive pattern, the distorted eye pattern as viewed through the lens may be captured by a detector (e.g., scanner, camera, CCD array or other imaging system) included in the input unit of the control processing system 300. The detector converts the captured pattern into an electrical spectrum signal for comparisons by the processor 315.

In Step 410 and as part of the processing, the contents of the verification request are extracted and mapped to a command (or set of commands) that corresponds to the request. The corresponding command(s) may then be automatically executed by the processor 315 of the computer system 302.

As part of the executing commands in Step 410, logic 340 is configured to generate a first dataset 210 from a plurality of fuzzy data values based on the generated DNA sequence. Each fuzzy data is transformed into a data value and at least one range value. The respective data values and range values are arranged in at least two data series of the first dataset 210, respectively.

In Step 420, using a hash function or hash algorithm which is applied to the DNA sequence to convert the DNA sequences into "Super Fingerprints", the first dataset 210 is then transformed by logic 340 from the first dataset 210 into a second dataset 220 that maintains the relationship of the data values and range values of the at least two data series.

In Step 430, the hashed data is further encrypted to provide an additional layer of security regarding the underlying raw biometric data.

In Step 440, the hashed data is stored within the data repository 330 for use in the blockchain 305. In Step 450, a query to compare the two hashed results is received and further processed. Step 460 instructs the computer system 302 to decrypt the hashed data to obtain the hashed computer readable information. In Step 460, a comparison between the hashed data can be performed by verifying that each byte of the hash value being compared falls within a predefined limit of variation around each byte of the reference hash value. Step 460 instructs the computer system 302 to compare the receiving hashed computer readable information with the hashed computer readable information stored on blockchain 305 to ensure that the computer readable information has remained unchanged from the hashed computer readable information initially stored on the blockchain by the user during the enrollment registration. Namely, the comparison includes comparing the distorted biometric signal received from the input unit to one or more identity patterns stored in the data repository connected to the blockchain. The process can search the distorted biometrics in the stored identity patterns previously enrolled. The comparison performed depends on the specific type of distorted biometric received.

In Step 470, the comparison can issue report results to determine an identity of the person who input the distorted biometric into the system. If the distorted biometric signal matches one of the identity patterns, then the identity of the person may be determined from the personal information stored in that person's electronic file. Conversely, if no match is found, the system may conclude that the person is an unidentified person and appropriate actions may be taken.

In Step 470, the comparison can issue report results signaling whether to grant or deny authorization for the person whose identification has been confirmed. Once a person has been identified, the system can further determine whether authorization or access to the system or to perform a particular task or activity on the system may be granted depending, for example, on the person's pre-established level of access (i.e. security clearance or access level). For example, a person may be allowed access to conduct one type of financial transaction on the system but deny the user access to conduct a different type of financial transaction because the person does not have the required pre-established level of access, permission level, or clearance level.

The foregoing embodiments and advantages are merely exemplary and are not to be construed as limiting the present invention. The present teaching can be readily applied to other types of apparatuses. For example, certain exemplary embodiments may involve data organized by an artificial intelligence (AI) engine. The artificial intelligence engine may involve statistical methods and computational intelligence to mimic human perception and manipulation of the process instances. The description of the present invention is intended to be illustrative, and not to limit the scope of the claims. Many alternatives, modifications, and variations will be apparent to those skilled in the art.

What is claimed is:

1. A method for verifying that distorted biometric information received by a computing device is authentic, comprising:
   receiving a signal indicative of a distorted biometric of a biometric of a person;
   determining, by a processor, a DNA sequence code of the signal indicative of the distorted biometric signal;
   generating, by the processor, a first dataset from a plurality of fuzzy data values based on the DNA sequence code, wherein each fuzzy data is transformed into a data value and at least one range value to obtain respective data values and range values, and wherein the respective data values and range values are arranged in at least two data series of the first dataset, respectively;
   transforming using a cryptographic function, by the processor, the first dataset, which is based on DNA sequence code, to obtain a second dataset, wherein the transforming maintains a relationship of the respective data values and the range values arranged in the at least two data series;
   encrypting, by the processor, the second dataset;
   storing the encrypted second dataset into a database that includes one or more biometric identifiers;
   publishing, by the processor, the generated first dataset to a database computing system for authentication;
   retrieving, by the processor, the encrypted second dataset from the database; and
   decrypting, by the processor, the encrypted second dataset to obtain the second dataset to authenticate that the database has validated the one or more biometric identifiers.

2. The method of claim 1, wherein the database is a plurality of distributed nodes that maintain a public database.

3. The method of claim 1, wherein the database is a private database.

4. A computer system, comprising:
   a processor;
   a memory device coupled to the processor; and
   a computer readable storage device coupled to the processor, wherein the storage device contains program code executable by the processor via the memory device to implement a method for verifying that distorted biometric information received by a computing device is authentic, the method comprising:
   receiving a signal indicative of a distorted biometric of a biometric of a person;
   determining, by a processor, a DNA sequence code of the signal indicative of the distorted biometric signal;
   generating, by the processor, a first dataset from a plurality of fuzzy data values based on the DNA sequence code, wherein each fuzzy data is transformed into a data value and at least one range value to obtain respective data values and range values, and wherein the respective data values and range values are arranged in at least two data series of the first dataset, respectively;
   transforming using a cryptographic function, by the processor, the first dataset, which is based on DNA sequence code, to obtain a second dataset, wherein the transforming maintains a relationship of the respective data values and the range values arranged in the at least two data series;

encrypting, by the processor, the second dataset;

storing the encrypted second dataset into a database that includes one or more biometric identifiers;

publishing, by the processor, the generated first dataset to a database computing system for authentication;

retrieving, by the processor, the encrypted second dataset from the database; and decrypting, by the processor, the encrypted second dataset to obtain the second dataset to authenticate that the database has validated the one or more biometric identifiers.

5. The computer system of claim 4, wherein the database is a plurality of distributed nodes that maintain a public database.

6. The computer system of claim 4, wherein the database is a private database.

* * * * *